US007714909B2

(12) United States Patent
Lord et al.

(10) Patent No.: US 7,714,909 B2
(45) Date of Patent: *May 11, 2010

(54) VIDEO BIT STREAM EXTENSION BY DIFFERENTIAL INFORMATION ANNOTATION

(75) Inventors: Christopher J. Lord, Portland, OR (US); Fernando C. M. Martins, Hillsboro, OR (US); Brian R. Nickerson, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 1005 days.

This patent is subject to a terminal disclaimer.

(21) Appl. No.: 10/757,300

(22) Filed: Jan. 14, 2004

(65) Prior Publication Data

US 2004/0148563 A1 Jul. 29, 2004

Related U.S. Application Data

(63) Continuation of application No. 09/347,947, filed on Jul. 6, 1999, now Pat. No. 6,842,190.

(51) Int. Cl.
*H04N 5/76* (2006.01)
(52) U.S. Cl. ............................. 348/231.5; 348/207.99
(58) Field of Classification Search ........................ None
See application file for complete search history.

(56) References Cited

U.S. PATENT DOCUMENTS 5,614,960 A * 3/1997 Chiba et al. ............... 348/700

| 5,880,775 | A | * | 3/1999 | Ross ................................ 348/143 |
| 6,332,144 | B1 | | 12/2001 | deVries |
| 6,357,042 | B2 | | 3/2002 | Srinivasan |

(Continued)

OTHER PUBLICATIONS

R. Tsai, "An Efficient and Accurate Camera Calibration Technique for 3D Machine Vision", Proceedings of the IEEE, Computer Vision and Pattern Recognition, pp. 364-374.

(Continued)

*Primary Examiner*—Thai Tran
*Assistant Examiner*—Heather R Jones
(74) *Attorney, Agent, or Firm*—Blakely, Sokoloff, Taylor & Zafman LLP

(57) ABSTRACT

A method and apparatus are provided for annotating video and audio media with supplementary content for post video processing. In one embodiment, the invention may include maintaining a current state of auxiliary information regarding a sequence of video frames, the sequence of video frames being encoded as a video bit stream having video frame data for each respective video frame of the sequence of video frames. It may further include comparing the current state of auxiliary information with auxiliary information regarding a current video frame of the sequence of video frames to determine differential information, and annotating the differential information to the video bit stream as an annotation to the video frame data for the current video frame.

21 Claims, 6 Drawing Sheets

U.S. PATENT DOCUMENTS

| | | | |
|---|---|---|---|
| 6,396,537 | B1 | 5/2002 | Squilla et al. |
| 6,530,021 | B1 | 3/2003 | Epstein et al. |
| 6,590,608 | B2 * | 7/2003 | Matsumoto et al. ...... 348/231.2 |
| 6,597,406 | B2 | 7/2003 | Gloudemans et al. |
| 2002/0054223 | A1 | 5/2002 | Spriggs |
| 2002/0060686 | A1 | 5/2002 | Matsumoto et al. |
| 2003/0011684 | A1 * | 1/2003 | Narayanaswami et al. ..................... 348/207.99 |
| 2003/0122941 | A1 | 7/2003 | Okayama |
| 2006/0187317 | A1 | 8/2006 | Montulli et al. |

OTHER PUBLICATIONS

D. Simon et al. "Real-time 3-D Pose Estimation Using a High-Speed Range Sensor", Technical Report CMU-RI-TR-93-24, Robotics Institutem Carnegie Mellon University, Nov. 1993.

F.C.M. Martins, et al. "3D-3D Registration of Free Formed Objects Using Shape and Texture", Conference on Visual Communications and Image Processing (VCIP '97), San Jose, CA.

L. Agapito, et al., "Linear Self Calibration of a Rotating and Zooming Camera", IEEE Conference on Computer Vision and Pattern Recognition (CVPR 1999), Ft. Collins, CO pp. 15-21.

* cited by examiner

VIDEO BIT STREAM EXTENSION BY DIFFERENTIAL INFORMATION ANNOTATION

CROSS REFERENCE TO RELATED APPLICATIONS

This continuation application claims the benefit of U.S. patent application Ser. No. 09/347,947 for Video Bit Stream Extension with Supplemental Content Information to Aid in Subsequent Video Processing, filed Jul. 6, 1999, now U.S. Pat. No. 6,842,190 Assignee Intel Corporation.

BACKGROUND

1. Field

The present invention is related to the field of video processing, and more specifically, to the method and apparatus of video bit stream extension to aid in subsequent video processing.

2. Related Art

Currently, the motion picture and television industries utilize various video processing methods and apparatus to create special effects to captured video. Typically, video images are captured by some type of a video capture device, and recorded on a storage device. One or more video sequences from one or more video sources, such as a storage device, may be analyzed to collect information regarding each video sequence. The collected information is then utilized to manipulate the video sequence through, for example, some type of computer system, to create special effects. For example, video sequences from two different sources may be merged by video compositing to create special effects. In order to perform video compositing, information regarding each video sequence may be useful.

It is therefore desirable to provide a method and apparatus to generate an extended video bit stream for a video sequence. The desired extended video bit stream would contain non-visual information useful in several applications including but not limited to motion picture and television special effects, post processing, video editing and video library management.

DETAILED DESCRIPTION

The present invention relates to a method and apparatus for producing an annotated video extended bit stream to aid video processing. In one embodiment of the present invention, certain video sequence information is collected on a per frame, per video segment or a per scene basis, as video data is being provided through a video source device. Video information is added to a video bit stream to generate an extended video bit stream with annotations (hereinafter referred to as an annotated video extended bit stream).

The annotated video extended bit stream of the present invention includes both the original video sequence as well as certain additional non-visual information. The additional non-visual information is useful in subsequent processing of the video data provided by a video source device for several applications including special effect processing, easy access to video databases, efficient video coding, and easier generation of three-dimensional models.

In one embodiment video and audio media are annotated with supplementary content for post video processing. Video data is accepted from a video source and video information associated with the video data is stored as the video data is being accepted. Then, the video information may be appended to the video data for later use in the form of annotations, for example.

Prior art methods must rediscover the information which the present invention annotates by using only the available visual data. Further, the present invention solves mathematically ill posed problems for which solutions are not available. Additionally, the present invention efficiently provides access to data for which solutions are possible, but are obtained through great computational cost. The present invention leads to better and faster compression via model building than prior art methods which rediscover the factors from the captured media only.

Additionally, the present invention allows better digital manipulation of media. For example, three-dimensional models of objects in a scene can be constructed and used as search keys in a video database, and geometric and photometric properties can be used as derived search keys. Camera scene content is already often under program control. This control information as well as what can be sensed in the camera, such as a cameraman turning a zoom lens and camera pose, is conveyed to subsequent processing software through the annotated video extended bit stream of the present invention.

Although the present invention is described for use in the motion picture and television industries, the present invention may also be useful in video cameras used by consumers to automatically or manually annotate certain parameters set during recording, such as zoom factor or focus.

Figure 1A:
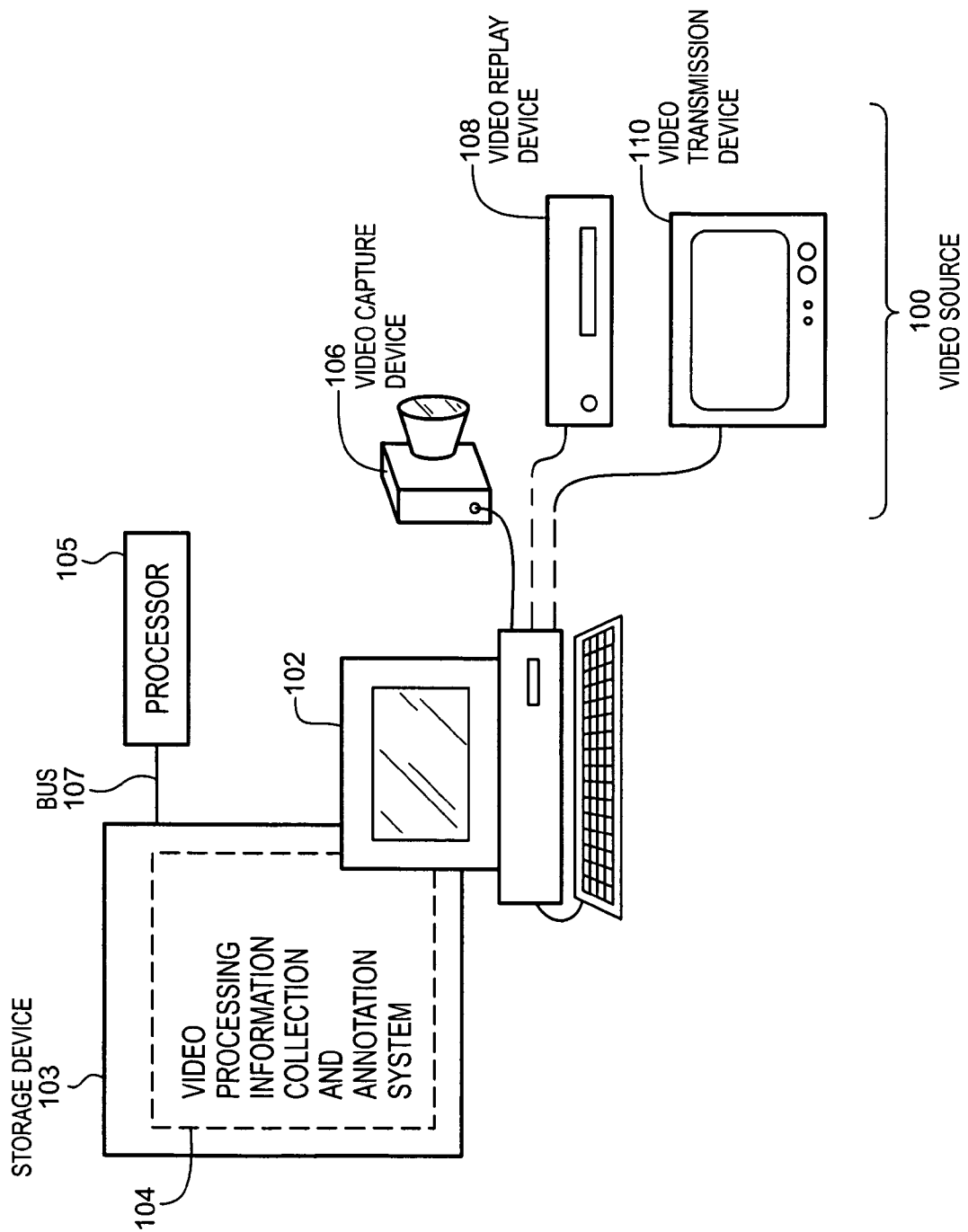
FIG. 1a is an exemplary system block diagram of a video source and video output video processing system according to one embodiment of the present invention.

FIG. 1a is an exemplary system block diagram illustrating a video source and video output system according to one embodiment of the present invention. In this example, the video processing information collection and annotation system 104 may be implemented for use on a computer 102 with some type of a storage device 103 coupled to a processor 105 by bus 107. The computer 102 may be coupled to a video source 100 configured to provide video data (video sequence) to the computer 102. In one embodiment, the video source 100 may be, but is not limited to, a video capture device 106 such as a camera, a video replay device 108 such as a video camera recorder (VCR) and a video transmission device 110 such as a digital or an analog television (TV).

The present invention's video processing information collection and annotation system 104 collects certain video processing information from video image data (frame or scene) as they are provided from the video source 100 and generates an annotated video extended bit stream comprised of the video image data as well as corresponding video processing information.

Although the video processing information collection and annotation system 104 is illustrated as being implemented in a computer 102, a person skilled in the art provided with the detailed description herein may appreciate that the video processing information collection and annotation system 104 may also be implemented in the video source 100 such as a camera.

Figure 1B:
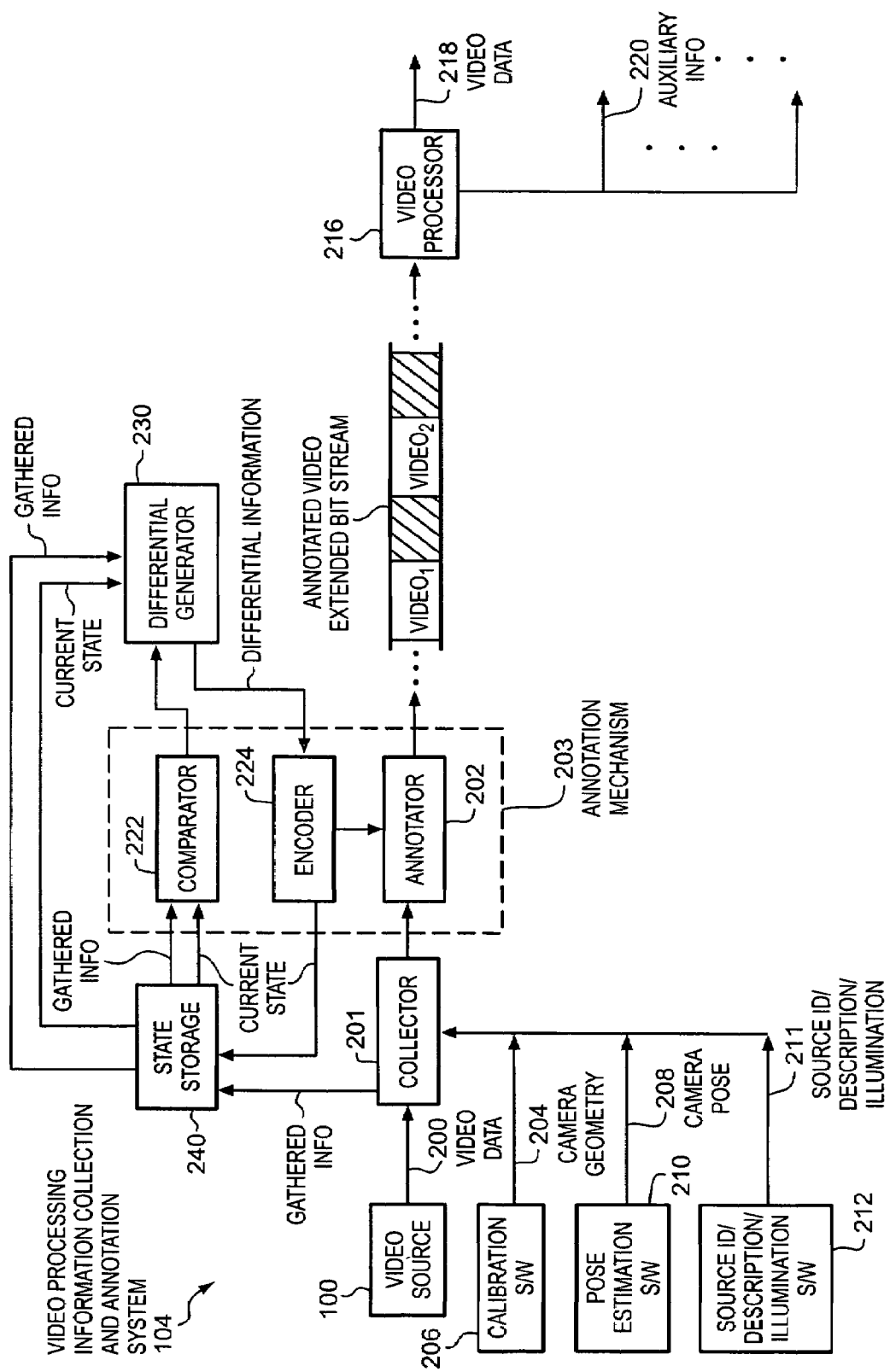
FIG. 1b illustrates a video processing information collection and annotation system according to one embodiment of the present invention.

FIG. 1*b* illustrates a video processing information collection and annotation system 104 according to one embodiment of the present invention. Video data 200 is provided by video source 100 in the form of frames (scenes) and forwarded to a collector 201. A calibration software 206, such as NCAMERA from REALVIZ of Sophia Antipolis Cedex, France, generates camera geometry information 204. The camera geometry information 204 may be generated either from the video data 200 provided by the video source 100 or as the video data is being captured by a video capture device 106. The camera geometry information 204 is then forwarded the information on to the collector 201. Similarly, a pose estimation software 210, such as MATCHMOVER from REALVIZ of Sophia Antipolis Cedex, France, generates camera pose information 208. The camera pose information 208 may be generated from the video data 200 provided by the video source 100 or at the same time that the video data 200 is being captured by a video capture device 106. The camera pose information 208 is then forwarded to the collector 201.

Source identification/description and illumination information is gathered by a source identification/description/illumination input software 212 from, for example, input by a camera operator (user) or a television director operating a television switcher (not shown). The information gathering may be fully automated by the television switcher. The gathered source identification/description/illumination information 211 is then forwarded along with the camera geometry information 204 and the camera pose information 208 to the collector 201. The collector 201 forwards the information collected to an annotator 202.

The current state of the frame data and the gathered information are received and compared by a comparator 222. The gathered information and current state are also received by a differential generator 230 which determines the differential information.

More specifically, the auxiliary information is gathered periodically but only encoded in the bit stream if there are changes. The current state indicates the latest encoded information in the bit stream and is kept in memory, e.g., state storage 240. The differential information is the difference between the current information and the gathered information. If the information remains the same, there is no need to annotate the bit stream.

The differential information is encoded by an encoder 224 as auxiliary information for the current frame data. The annotator 202 stores the various information gathered in the video bit stream 200 by extending the original bit stream format.

The annotated video extended bit stream 214 may be utilized by a video processor 216 to separate video data 218 from auxiliary information 220. The video data 218 is equivalent to video data 200 before processing by the annotator 202 and the auxiliary information 220 is additional information gathered regarding the video data 200 including the camera geometry information 204, the camera pose information 208 and the source identification/description/illumination information 211.

Figure 2:
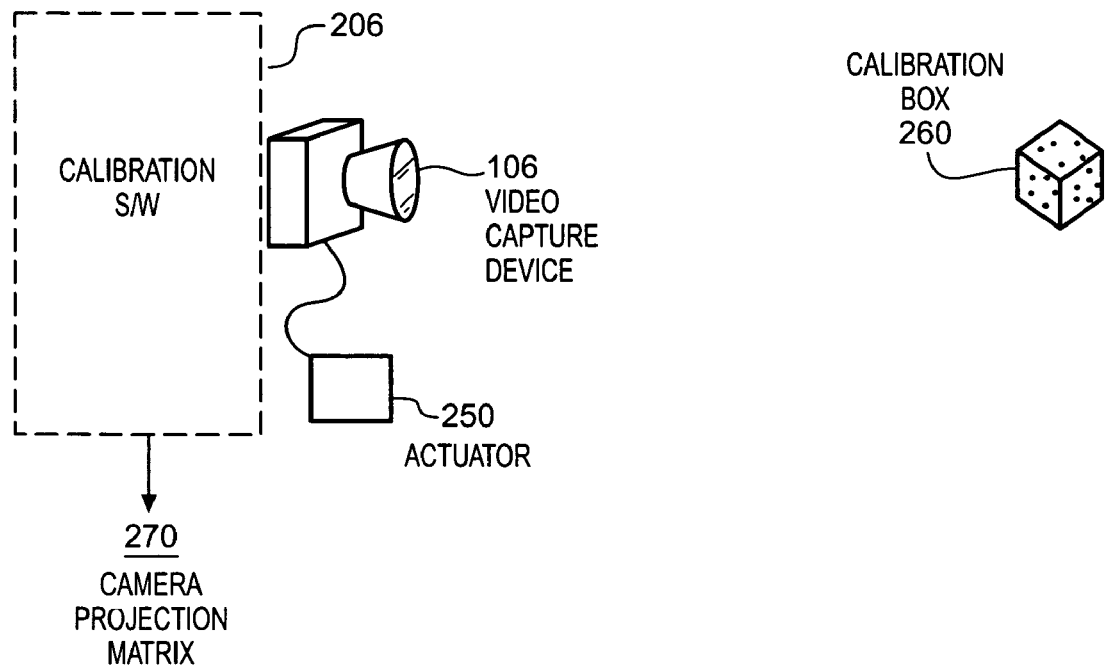
FIG. 2 is a block diagram illustrating calibration software configured to determine camera geometry information from each frame and/or scene data of a video sequence made available through a video source device according to one embodiment of the present invention.

FIG. 2 is a block diagram illustrating the gathering of calibration information according to one embodiment of the present invention. In this example, camera geometry (intrinsic parameters) is provided by a camera calibration procedure which provides a camera projection matrix 270. In one embodiment, instrumentation attached to a set of actuators 250 is used to control and keep track of the geometry of cameras (e.g., auto-focus). Calibration is obtained by using a calibration box 260 of known size and shape with a distinct set of markers on its surface. The calibration software 206 utilizes the calibration box 260 to produce the camera projection matrix 270.

More specifically, in one embodiment, a video capture device 106 such as a camera causes a transformation to the incumbent light. This transformation depends on the physical arrangement of lenses and light sensors of the video capture device that is modeled by a 3×4 transformation matrix also referred herein as a camera projection matrix 270. The twelve parameters from the projection matrix define the camera geometry. Various methods for producing the projection matrix 270 are well known.

Figure 3:
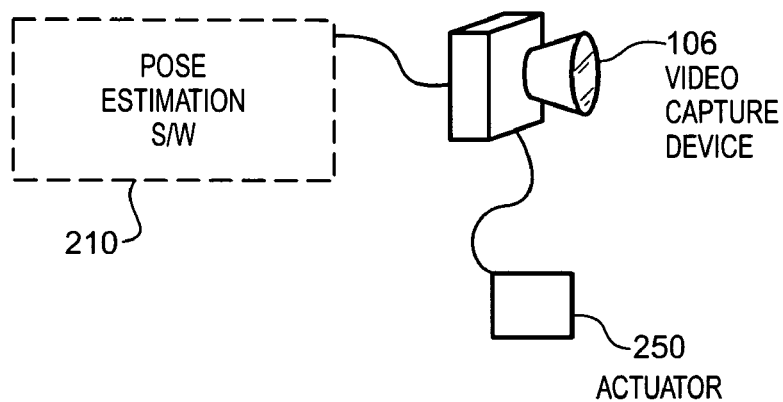
FIG. 3 is a block diagram of pose estimation software configured to determine camera pose information for each frame and/or scene data collected from a video source device according to one embodiment of the present invention.

FIG. 3 is a block diagram illustrating the gathering of camera pose estimation information according to one embodiment of the present invention. The camera pose information 208 includes extrinsic camera parameters. More specifically, the images generated by a video capture device such as a camera depends on the position of the video capture device 106. The six degrees of freedom of camera pose may be defined with respect to a given reference. For example, the position of the camera on the very first frame may be used as a reference from which the camera pose for the subsequent frames may be measured.

Computation of the pose estimation information 208 may be made by the pose estimation software 210. Depth maps are estimated from a video sequence by using structure from motion. For example, the registration of the depth map to a three-dimensional model of the scene provides the pose information. The three-dimensional scene model may be constructed using the registered data in one embodiment. Obtaining pose estimation from video data is well known in the art and needs no further discussion.

Alternatively, camera pose may be provided by a position tracking system based on gyroscopes, pendulums or magnetic field sensors (similar to those used in virtual reality helmets) installed in a video capture device 106 and provided to the collector 2*d* by the video capture device 106. Instrumentation attached to a set of actuators 250 (attached to the video capture device 106) may be used to remotely control the pose of robotic cameras remotely.

Figure 4:
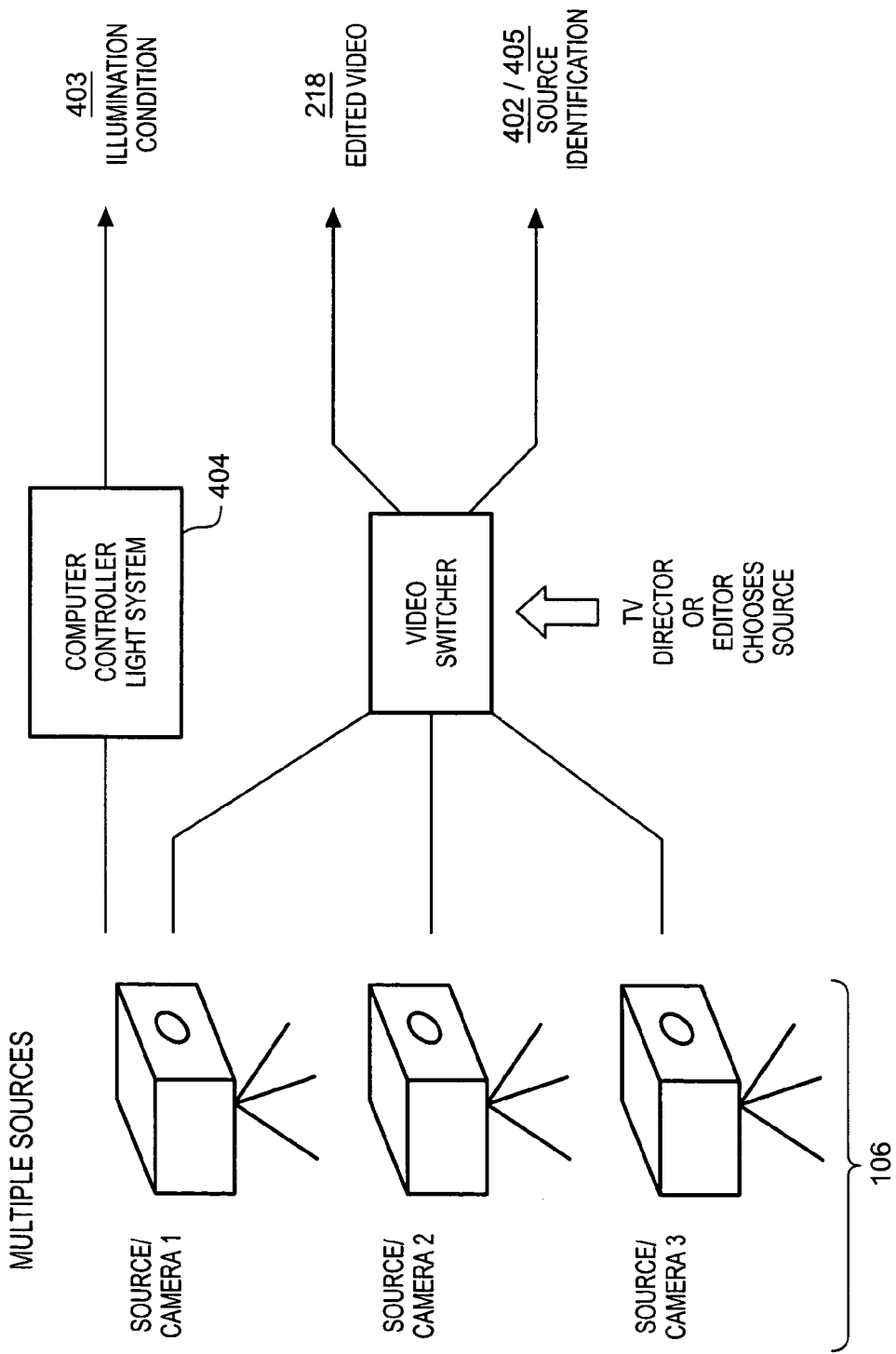
FIG. 4 is a block diagram of illumination input software which is configured to accept illumination information for a given frame or scene data of a video sequence provided through a video source device according to one embodiment of the present invention.

FIG. 4 is a block diagram illustrating the gathering of source identification/description and illumination information according to one embodiment of the present invention. Video source identification and description is provided by using information which is available either at a television (TV) switcher (live production) or editing A/B roll machine (off-line production). A TV director/editor defines an editing list which is implemented by an operator controlling the TV switcher 400 or A/B roll machine.

All cameras and video sources are logged before actual editing. For future movies, this process is performed at the story board. Story board drawings and text have a one-to-one correspondence to video shoots. Individual shoot description may be annotated with the final video at production time.

Video source identification 402, which is part of the source identification/description/illumination information 211 delineates one parameter which defines a source number. More specifically, production video typically is composed from multiple video sources 106 where each clip may be identified at production time. Each clip has an associated parameter which defines a source number for the clip.

The video source description 405 of the source identification/description/illumination information 211 refers to textual descriptions for distinct video sources. For instance, TV directors typically have textual descriptions for distinct video sources, such as for a National Basketball Association (NBA) game. "Scoreboard shoot", "court overview", "action on court", "close-up on coach", or "close-up of commentator" are different source descriptions.

Finally, the illumination condition 403, also part of the source identification/description/illumination information 211, refers to computer controlled sets and lighting system 404. The controls may be annotated as part of the scene description as well. For insertion of computer-generated actors in a scene, lighting information is fundamental on a per-frame basis.

Figure 5A:
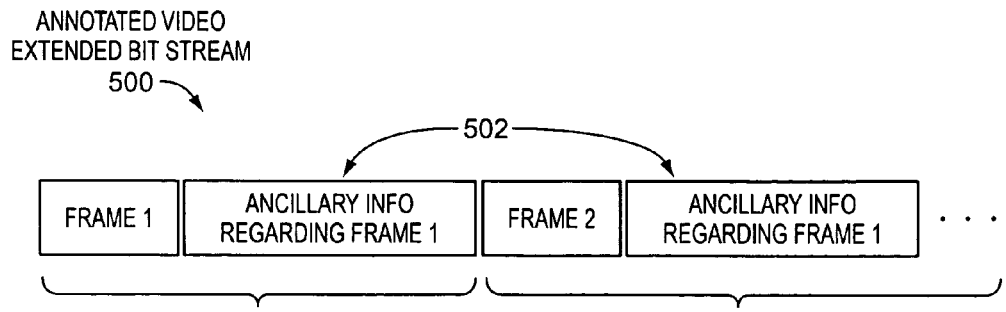
FIGS. 5a-5c illustrate an annotated video extended bit stream format according to one embodiment of the present invention.
Figure 5B:
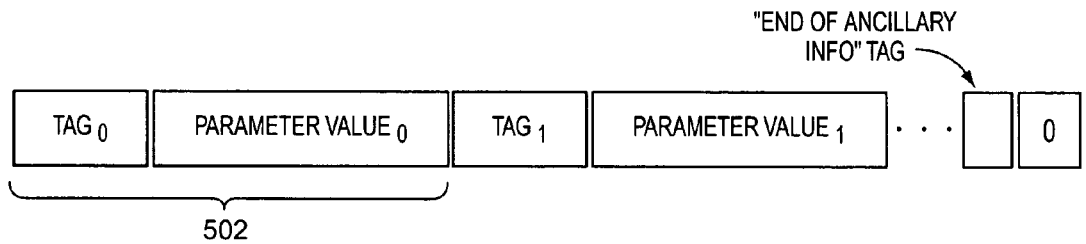
Figure 5C:
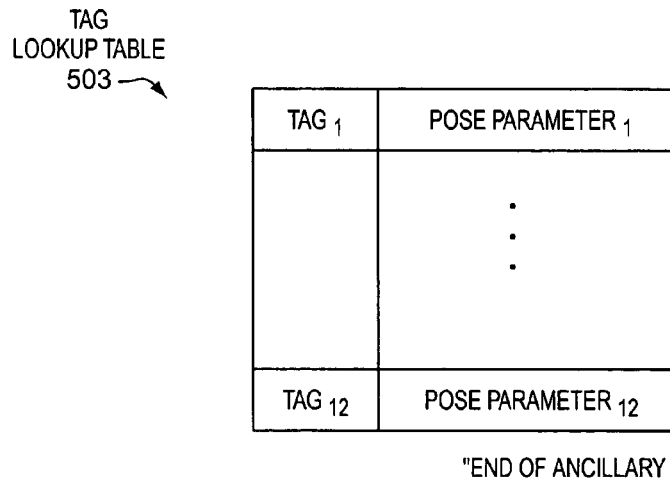

FIGS. 5a-5c illustrate an exemplary annotated video extended bit stream format according to one embodiment of the present invention. The exemplary annotated video extended bit stream 500 illustrated in FIG. 5a has ancillary information 502 which is a list of parameters of arbitrary length. The parameters are described in more detail in a corresponding entry in a tag lookup table 503 illustrated in FIG. 5c. In one embodiment, the tag lookup table 503 resides in storage device 103. The parameters having the information described in FIGS. 2, 3 and 4 are valid until a new setting appears in the annotated video extended bit stream 500.

Figure 6:
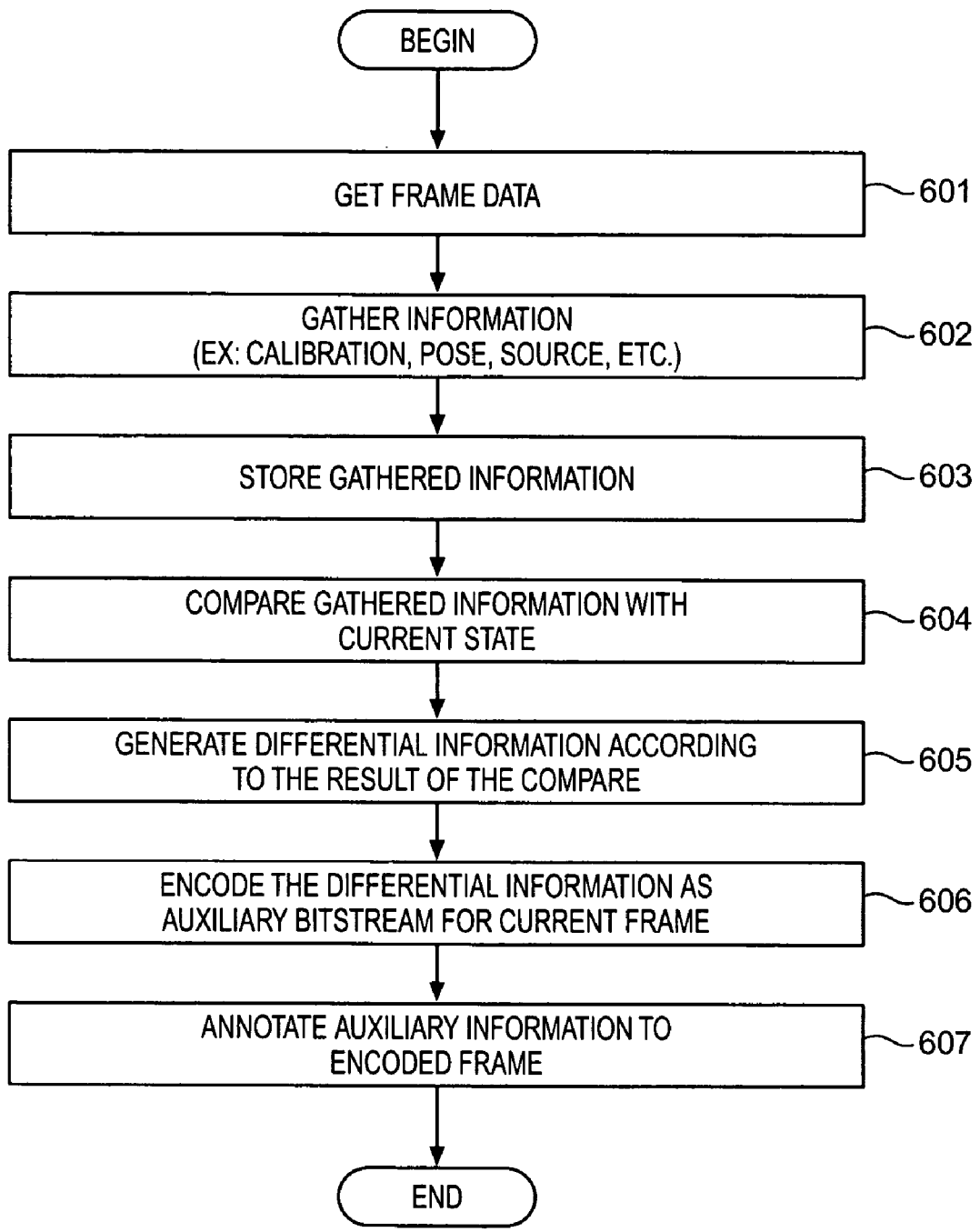
FIG. 6 is a flow diagram illustrating the general steps followed by annotator software configured to annotate a video bit stream with certain video processing information according to one embodiment of the present invention.

FIG. 6 is a flow diagram illustrating the general steps followed by annotator software configured to annotate a video bit stream with certain video processing information according to one embodiment of the present invention. In step 601, frame data is obtained from a video source. In step 602, information regarding the frame data, including camera geometry 204, camera pose 208 and source identification description illumination software 211 is gathered. In step 603, gathered information is stored in a state storage device. In step 604, the current state of the frame data and the gathered information is compared by a comparator 222.

In step 605, differential information is generated according to the results of the comparison. More specifically, the auxiliary information is gathered periodically but only encoded in the bit stream if there are changes. The current state indicates the latest encoded information in the bit stream and is kept in memory. The differential information is the difference between the current information and the gathered information. If the information remains the same, there is no need to annotate the bit stream.

In step 606, the differential information is encoded by an encoder 224 as auxiliary information for the current frame data. In step 607, the auxiliary information is annotated to the encoded frame data to generate an annotated video extended bit stream 214.

What has been described is a method and apparatus for annotating video and audio media with supplementary content for subsequent video processing. Prior art methods must rediscover the information which the present invention annotates by using only the available visual data. The present invention solves mathematically ill posed problems for which solutions are not available. Additionally, the present invention efficiently provides access to data for which solutions are possible, but are obtained through great computational cost. The present invention leads to better and faster compression via model building than prior art methods which rediscover the factors from the captured media only.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed is:

1. A method comprising:

maintaining a current state of auxiliary information regarding a first frame of a sequence of video frames in storage in a local device hardware memory, the sequence of video frames being encoded as a video bit stream having video frame data for each respective video frame of the sequence of video frames, the auxiliary information comprising non-visual information regarding the video frames;

using an electronic comparator comparing the stored current state of auxiliary information with auxiliary information regarding a later current video frame of the sequence of video frames to determine differential information; and annotating the differential information to the video bit stream as an annotation to the video frame data for the current video frame only if the differential information indicates a change from the current state of the auxiliary information.

2. The method of claim 1, wherein the current state of auxiliary information indicates the latest encoded information in the bit stream and is maintained in a state storage memory.

3. The method of claim 1, wherein the auxiliary information comprises video processing information regarding video frames.

4. The method of claim 1, further comprising encoding the differential information before annotating the differential information.

5. The method of claim 4, wherein the encoded differential information comprises a list of parameters, the parameters being described in a tag lookup table.

6. The method of claim 1, wherein annotating the differential information comprises extending the video bit stream format to include the differential information.

7. The method of claim 1, further comprising gathering the video information regarding the current video frame.

8. The method of claim 7, wherein the differential information comprises the difference between the current state of the auxiliary information and the gathered information.

9. A computer readable medium having stored thereon data representing instructions which, when executed by a computer, cause the computer to perform operations comprising:

maintaining a current state of auxiliary information regarding a first frame of a sequence of video frames in storage in a local memory, the sequence of video frames being encoded as a video bit stream having video frame data for each respective video frame of the sequence of video frames, the auxiliary information comprising non-visual information regarding the video frames;

comparing the stored current state of auxiliary information with auxiliary information regarding a later current video frame of the sequence of video frames to determine differential information;

annotating the differential information to the video bit stream as an annotation to the video frame data for the current video frame only if the differential information indicates a change from the current state of the auxiliary information.

10. The medium of claim 9, wherein the current state of auxiliary information indicates the latest encoded information in the bit stream and is maintained in a state storage memory.

11. The medium of claim 9, further comprising encoding the differential information as a list of parameters, the parameters being described in a tag lookup table, before annotating the differential information.

12. The medium of claim 11, wherein annotating the differential information comprises extending the video bit stream format to include the differential information.

13. An apparatus comprising:
a collector to receive auxiliary information regarding a first frame of a sequence of video frames and to maintain in storage a current state of the auxiliary information in a memory of the collector, the sequence of video frames being encoded as a video bit stream having video frame data for each respective video frame of the sequence of video frames, the auxiliary information comprising non-visual information regarding the video frames;
a comparator to receive the auxiliary information and compare the stored current state of the auxiliary information with auxiliary information regarding a later current video frame of the sequence of video frames to determine differential information; and
an annotator to store the differential information in the video bit stream by extending the original bit stream format only if the differential information indicates a change from the current state of the auxiliary information.

14. The apparatus of claim 13, wherein the auxiliary information comprises video processing information regarding video frames.

15. The apparatus of claim 13, wherein the collector receives the sequence of video frames.

16. The apparatus of claim 13, further comprising a state storage memory coupled to the collector to store the current state of the auxiliary information.

17. The apparatus of claim 13, further comprising an encoder to encode the differential information as auxiliary information for the current frame data.

18. The apparatus of claim 13, wherein the encoded differential information comprises a list of parameters, the parameters being described in a tag lookup table.

19. The apparatus of claim 13, wherein the auxiliary information comprises additional non-visual information regarding camera geometry and identification for the video frames.

20. The apparatus of claim 13, wherein the auxiliary information comprises video processing information regarding descriptions and camera positions for the video frames.

21. An apparatus comprising:
a collector to receive auxiliary information regarding a first frame of a sequence of video frames and to maintain in storage a current state of the auxiliary information, the sequence of video frames being encoded as a video bit stream having video frame data for each respective video frame of the sequence of video frames;
a state storage memory coupled to the collector to store the current state of the auxiliary information;
a comparator to receive the auxiliary information and compare the stored current state of the auxiliary information with auxiliary information regarding a later current video frame of the sequence of video frames to determine differential information; and
a tag lookup table defining settable parameters;
an annotator to store the differential information using the settable parameters in the video bit stream by extending the original bit stream format only if the differential information indicates a change from the current state of the auxiliary information.

* * * * *